(12) United States Patent
Roberts et al.

(10) Patent No.: US 11,598,436 B2
(45) Date of Patent: Mar. 7, 2023

(54) SAFETY VALVES FOR USE AT EXTREMELY HIGH TEMPERATURES

(71) Applicant: Dresser, LLC, Houston, TX (US)

(72) Inventors: Andrew Crosby Roberts, Houston, TX (US); Richard John Klimas, Jr., Orange Park, FL (US); Nicholas Ray Myers, Blythewood, SC (US); Robert Stewart McKee, Plymouth, MA (US); Dien Nguyen, Houston, TX (US); Rick Cole Hunter, Houston, TX (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 17/230,313

(22) Filed: Apr. 14, 2021

(65) Prior Publication Data

US 2022/0333705 A1   Oct. 20, 2022

(51) Int. Cl.
*F16K 17/04* (2006.01)
*F16K 17/06* (2006.01)

(52) U.S. Cl.
CPC .......... *F16K 17/0433* (2013.01); *F16K 17/06* (2013.01); *Y10T 137/7738* (2015.04)

(58) Field of Classification Search
CPC ......... Y10T 137/7738; Y10T 137/7929; F16K 17/0466
See application file for complete search history.

(56) References Cited

U.S. PATENT DOCUMENTS

| | | | | |
|---|---|---|---|---|
| 867,702 A | * | 10/1907 | Clarke | F16K 15/063 137/514.5 |
| 1,668,453 A | * | 5/1928 | Graesser | F16K 17/10 137/516 |
| 2,260,381 A | * | 10/1941 | Kennon | F16K 15/02 137/902 |
| 2,335,829 A | * | 11/1943 | McBride | F16K 17/044 137/512 |
| 2,429,578 A | * | 10/1947 | Gleasman | F16K 15/063 137/538 |
| 2,628,632 A | | 2/1953 | Dayton | |
| 2,643,671 A | * | 6/1953 | Dayton | F16K 17/0466 251/368 |
| 2,670,922 A | * | 3/1954 | Carlisle | F16K 15/026 137/540 |
| 3,025,874 A | * | 3/1962 | Yocum | F16K 17/06 137/540 |

(Continued)

FOREIGN PATENT DOCUMENTS

JP   1993014766 U   2/1993
KR   20190133550 A   12/2019

*Primary Examiner* — Robert K Arundale
(74) *Attorney, Agent, or Firm* — Paul Frank + Collins P.C.

(57) ABSTRACT

A safety valve is configured for use at temperatures at or above 760° C. (1400° F.). The safety valve includes a closure assembly that can create a self-energizing, metal-to-metal seal. In one implementation, this closure assembly includes a disc with an arcuate finger that circumscribes an axis of fluid flow through a seat. The arcuate finger may extend inwardly toward this axis and downwardly toward the seat. This geometry permits the finger to flex in response to pressure of fluid that impinges on the downstream side of the disc, such flexure causing a first sealing surface on the disc to more forcefully contact a second sealing surface on a seat.

19 Claims, 5 Drawing Sheets

(56) References Cited

U.S. PATENT DOCUMENTS

| | | | | |
|---|---|---|---|---|
| 3,433,250 | A | * | 3/1969 | Noboru ............... F16K 17/0466 137/474 |
| 3,811,470 | A | * | 5/1974 | Schaefer ............... F16K 15/063 137/540 |
| 5,011,116 | A | * | 4/1991 | Alberts ............... F16K 17/0433 251/334 |
| 5,370,151 | A | * | 12/1994 | Smart ..................... F16K 17/04 137/468 |
| 5,560,343 | A | * | 10/1996 | Werkmann ......... F02M 37/0029 123/506 |
| 8,413,955 | B1 | | 4/2013 | Rooney |
| 8,505,572 | B2 | | 8/2013 | Krithivasan |
| 2005/0205135 | A1 | * | 9/2005 | Motojima ........... F16K 17/0493 137/542 |
| 2006/0196553 | A1 | * | 9/2006 | Kane .................... F16K 15/026 137/538 |
| 2019/0145537 | A1 | * | 5/2019 | Kumar ................. F16K 15/044 137/539 |

\* cited by examiner

SAFETY VALVES FOR USE AT EXTREMELY HIGH TEMPERATURES

BACKGROUND

Flow controls find use in myriad applications. Pressure relief valves or "safety" valves are types of flow controls that protect against rapid increases in pressure of flowing fluids. These devices are often necessary to avoid overpressure conditions in super-heated steam that flows throughout thermal hydraulic power plants (and like facilities). Failure to contain overpressure can lead to extensive, and even catastrophic, damage to equipment or parts of the facility. However, although safety valves are required, improvements in output efficiencies for plant designs have led to operating conditions, including Advanced Ultra-Supercritical (AUSC) steam that regularly exceeds 760° C. (1400° F.), that outstrip even the most robust designs.

SUMMARY

The subject matter of this disclosure relates to improvements that outfit safety valves to meet these new requirements. Of particular interest are embodiments that employ a unique disc/seat interface that can maintain seal tightness at pressure upwards of 4,200 psi at over 1,400° F. This interface incorporates overlapping geometry on both the disc and seat that maximizes contact stress at set pressure for the device.

DRAWINGS

Reference is now made briefly to the accompanying drawings, in which.

Figure 1:
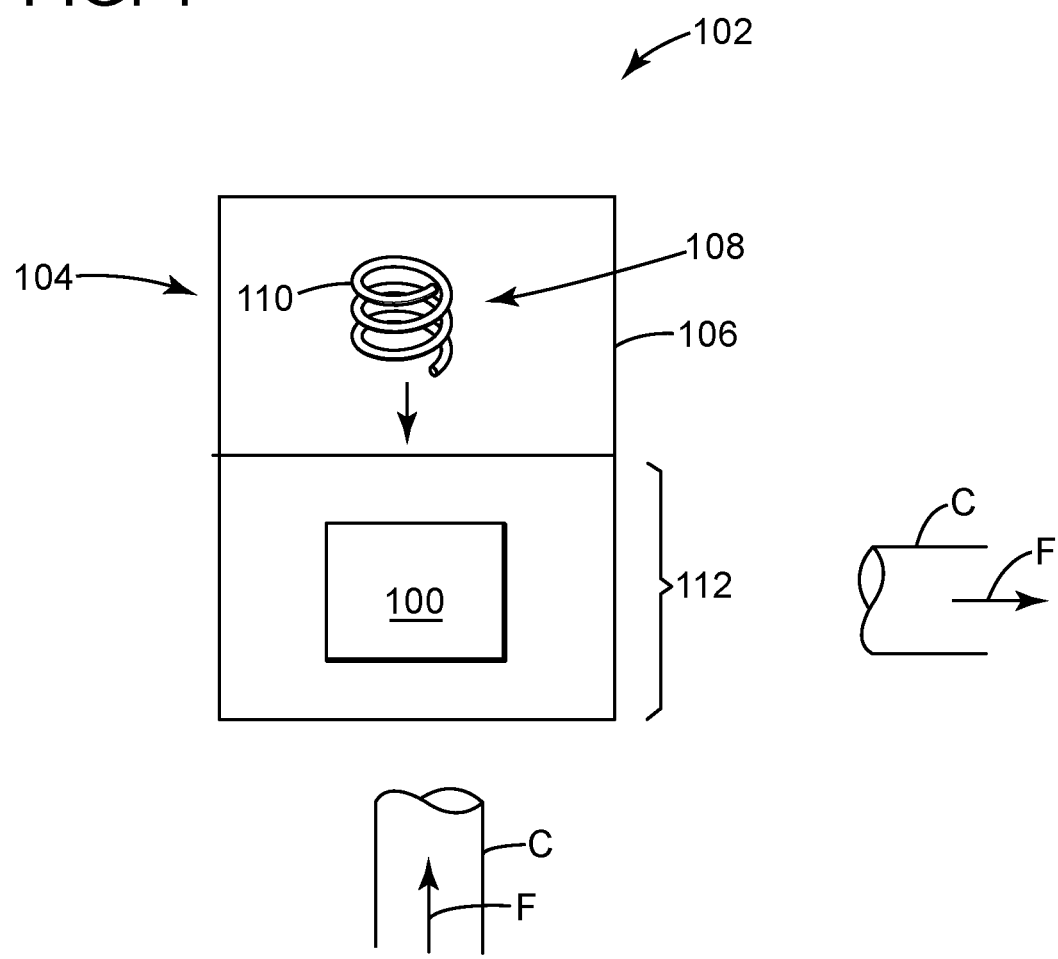
FIG. 1 depicts an exemplary embodiment of a closure assembly for a safety valve.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

The drawings and any description herein use examples to disclose the invention. These examples include the best mode and enable any person skilled in the art to practice the invention, including making and using any devices or systems and performing any incorporated methods. An element or function recited in the singular and proceeded with the word "a" or "an" should be understood as not excluding plural of said elements or functions, unless such exclusion is explicitly recited. References to "one embodiment" or "one implementation" should not be interpreted as excluding the existence of additional embodiments or implementations that also incorporate the recited features.

DESCRIPTION

The discussion now turns to describe features of the embodiments shown in drawings noted above. These embodiments perform better under extreme conditions because of unique geometry found at its seal interface. This geometry incorporates features that can flex or bend under pressure. These features create a more forceful seal that maintains its integrity very near the operating or set pressure for the safety valve. Other embodiments may be within the scope of this disclosure.

FIG. 1 depicts a schematic diagram of an example of a closure assembly 100. This example is part of a safety valve 102 with valve mechanics 104 that regulate the closure assembly 100. The valve mechanics 104 may include a pre-load unit 106 in position to generate a load L on the closure assembly 100. The pre-load unit 106 may include a biasing component 108, typically a coiled, compression spring 110. As also shown, the closure assembly 100 may reside in a base 112 that can couple with conduit C that relieves over-pressurized fluid F, for example, super-heated steam in a power plant.

Broadly, the closure assembly 100 may be configured for extreme operating conditions. These configurations may include parts that create a metal-to-metal seal to prevent flow of fluid F through the device during "non-relieving" conditions. The parts are arranged so that the seal is "self-energizing" to maintain seal tightness at set pressure for the safety valve. This feature avoids leakage that may occur as the inlet pressure approaches the load that creates (and maintains) the seal between the parts of the device. As an added benefit, the proposed design does not compromise seal tightness after the load slams the valve shut, for example, following a rapid overpressure event.

The safety valve 102 may be configured to protect against these overpressure conditions. The configurations may find use in thermal-hydraulic power plants that flow high-pressure steam. However, this disclosure does contemplate that the concepts herein may apply to other applications, including those applications that handle fluids had high pressures and high temperatures. In one implementation, the valve mechanics 104 may regulate movement of the closure assembly 100 as between a closed position and an open position.

The pre-load unit 106 may be configured to maintain the metal-to-metal seal even under high pressure upstream of the closure assembly 100. These configurations may include mechanics to pre-load the biasing component 108. The mechanics may compress the compression spring 110 by an amount that generates spring force necessary to achieve load L to maintain the safety valve 100 in its closed position and prevent flow of fluid F through the closure assembly 100. Pressure upstream of the closure assembly 100 that exceeds load L may compress the compression spring 110 to cause the safety valve 102 to change to its open position. Fluid F will flow through the closure assembly 100 in this open position. In one implementation, the closure assembly 100 will remain open until pressure upstream falls below load L, which allows the compression spring 110 to return to its previous deflected position (associated with the closed position of the closure assembly 100).

Figure 2:
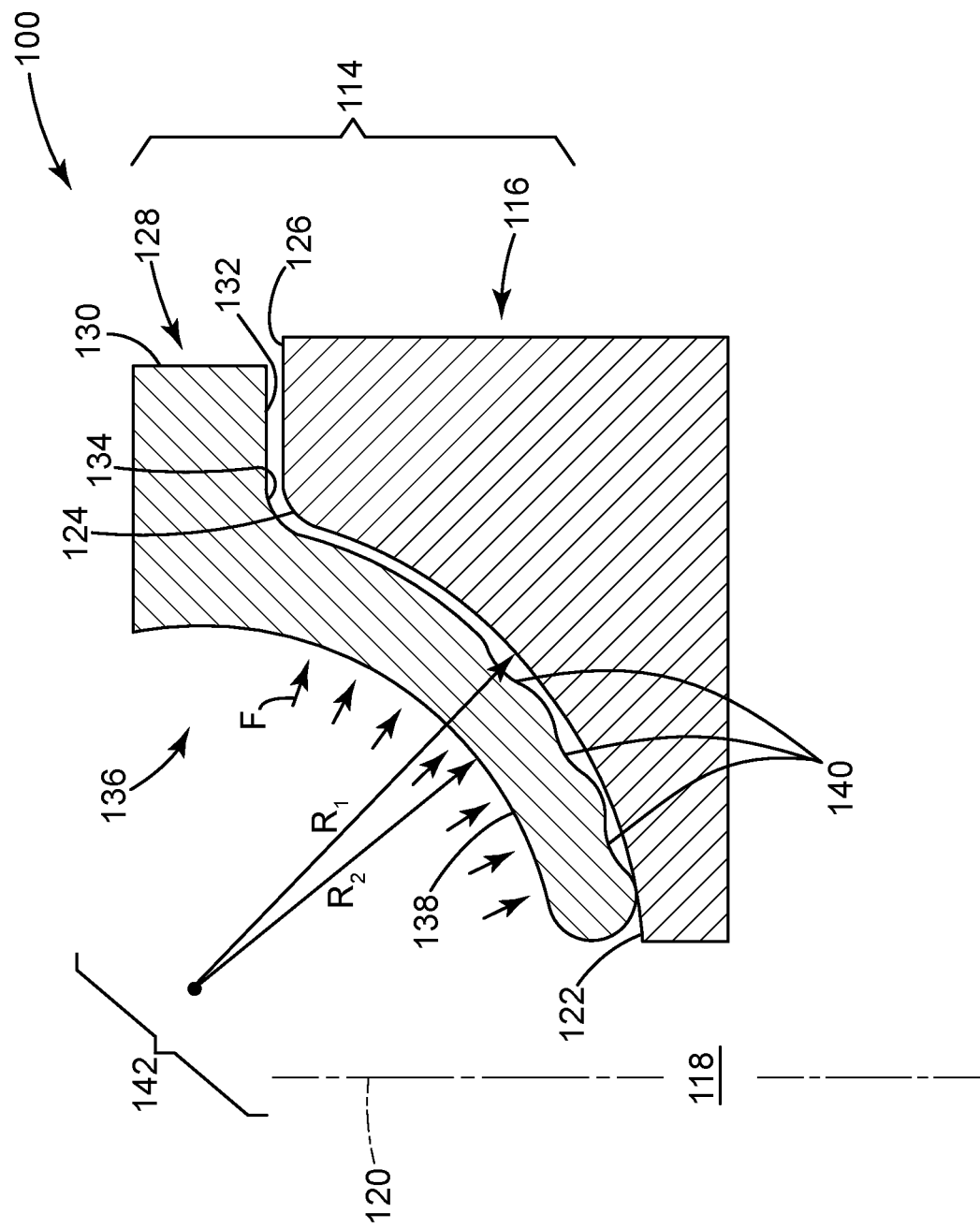
FIG. 2 depicts an example of a disc and a seat for the closure assembly of FIG. 1.

FIG. 2 depicts an elevation view of the cross-section of an example of the closure assembly 100. This example has a contact interface 114 that includes a seat 116 that has an aperture 118 with a center axis 120. The aperture 118 may have an inner surface 122 with a radius $R_1$. The inner surface 122 may terminate at a corner 124, preferably rounded, that itself terminates at a planar or flat seating surface 126. Adjacent the seat 116 is a disc 128 with an outer surface 130 that has a planar or flat contact shoulder 132 that abuts a rounded corner 134. An undercut 136 in the disc 128 may form an arcuate finger 138 that curves inwardly toward the center axis 120. The arcuate finger 138 may have a radius $R_2$ that closely matches the radius $R_1$ of the inner surface 122. In the closed position, the outer surface 132 on the arcuate finger 138 contacts the inner surface 124 on the seat 116 to form the seal that prevents flow of fluid F through the device (unless pressure increases to overcome the load L as discussed herein). The undercut 136 permits fluid F to impinge on the arcuate finger 138. The resulting pressure may bend or flex the arcuate finger 138 outwardly and downwardly (toward the inner surface 122 of the seat 116). These "self-energizing" properties increase effectiveness of the seal under extreme temperature and pressure conditions. In one implementation, the outer surface 132 on the arcuate finger 138 may include a series of concentric recesses 140 that form a "serrated" or "dimpled" portion 142 proximate a rounded end 144. The dimpled portion 142 may help to increase contact stresses at the contact interface 114 to further improve the seal as well.

Figure 3:
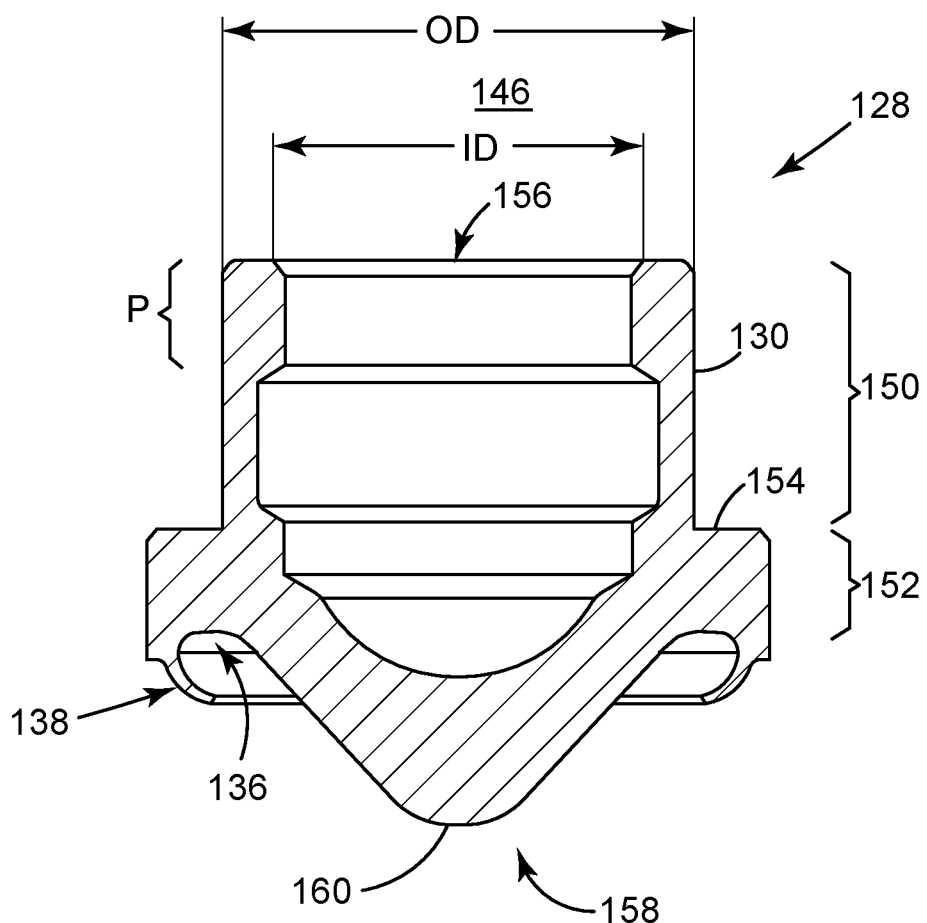
FIG. 3 depicts an example of the disc of FIG. 2.

FIG. 3 depicts an elevation view of the cross-section of an example of the disc 128 for use in the closure assembly 100. This example has a generally cylindrical shape with ends 146, 148. The outer surface 132 may have a stepped profile that corresponds to changes in an outer diameter OD of the cylinder. This stepped profile may support a percentage of the spring load to reduce stress within the arcuate finger 138. In one implementation, the changes may include an increase in the outer diameter OD to form a pair of concentric portions 150, 152. A shoulder 154 may separate the two portions 150, 152. On one end 146 of the disc 128, a recess 156 may penetrate into the material. The recess 156 may feature an inner diameter ID of varying values. Preferably, the recess 156 may have a portion P that is threaded. The other end 148 may have a conical protrusion 158 with a blunt end 160. The conical protrusion 158 may terminate at the undercut 136 that forms the arcuate finger 138.

Figure 4:
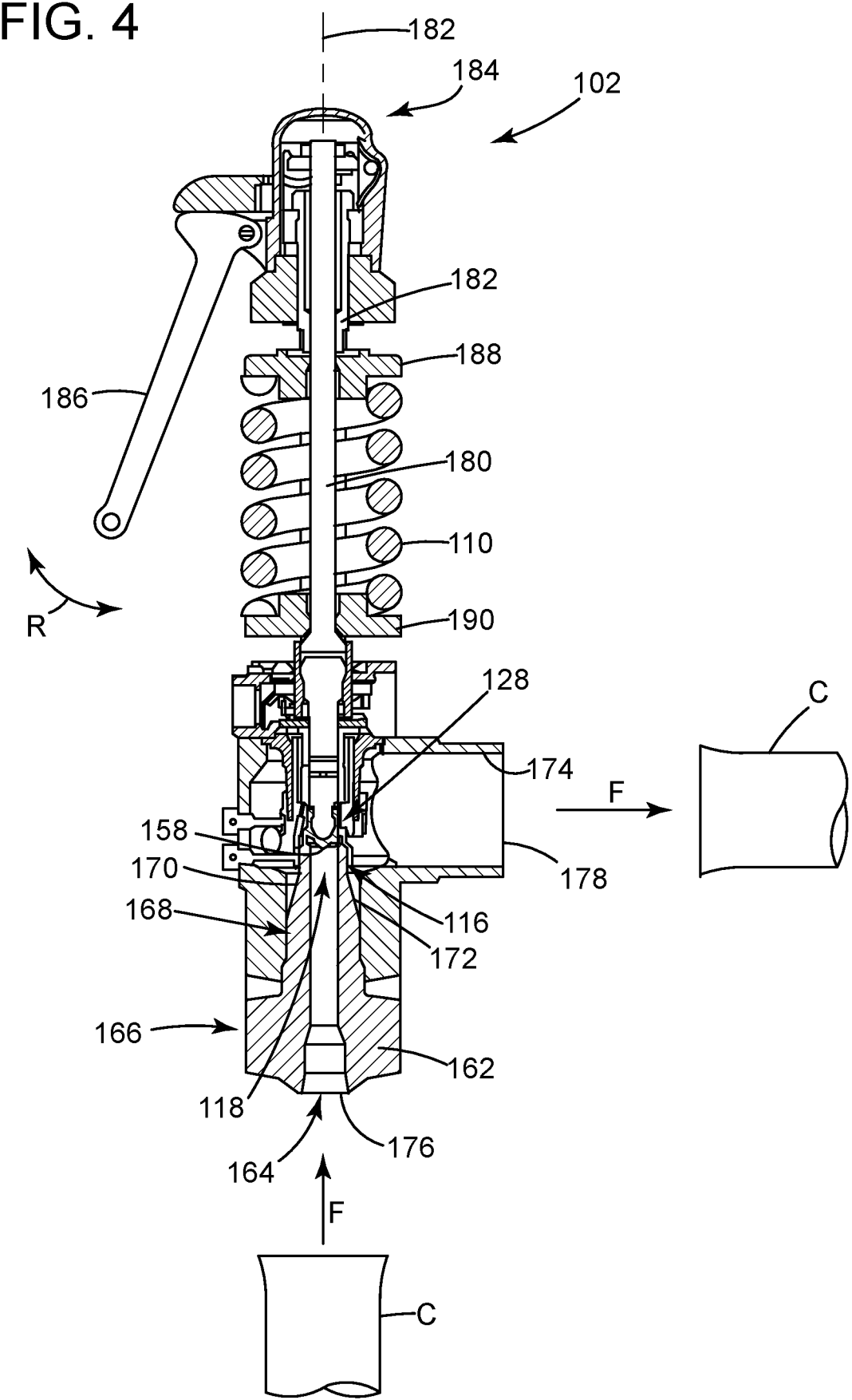
FIG. 4 depicts an example the disc and the seat of FIG. 2 as part of an exemplary safety valve.
Figure 5:
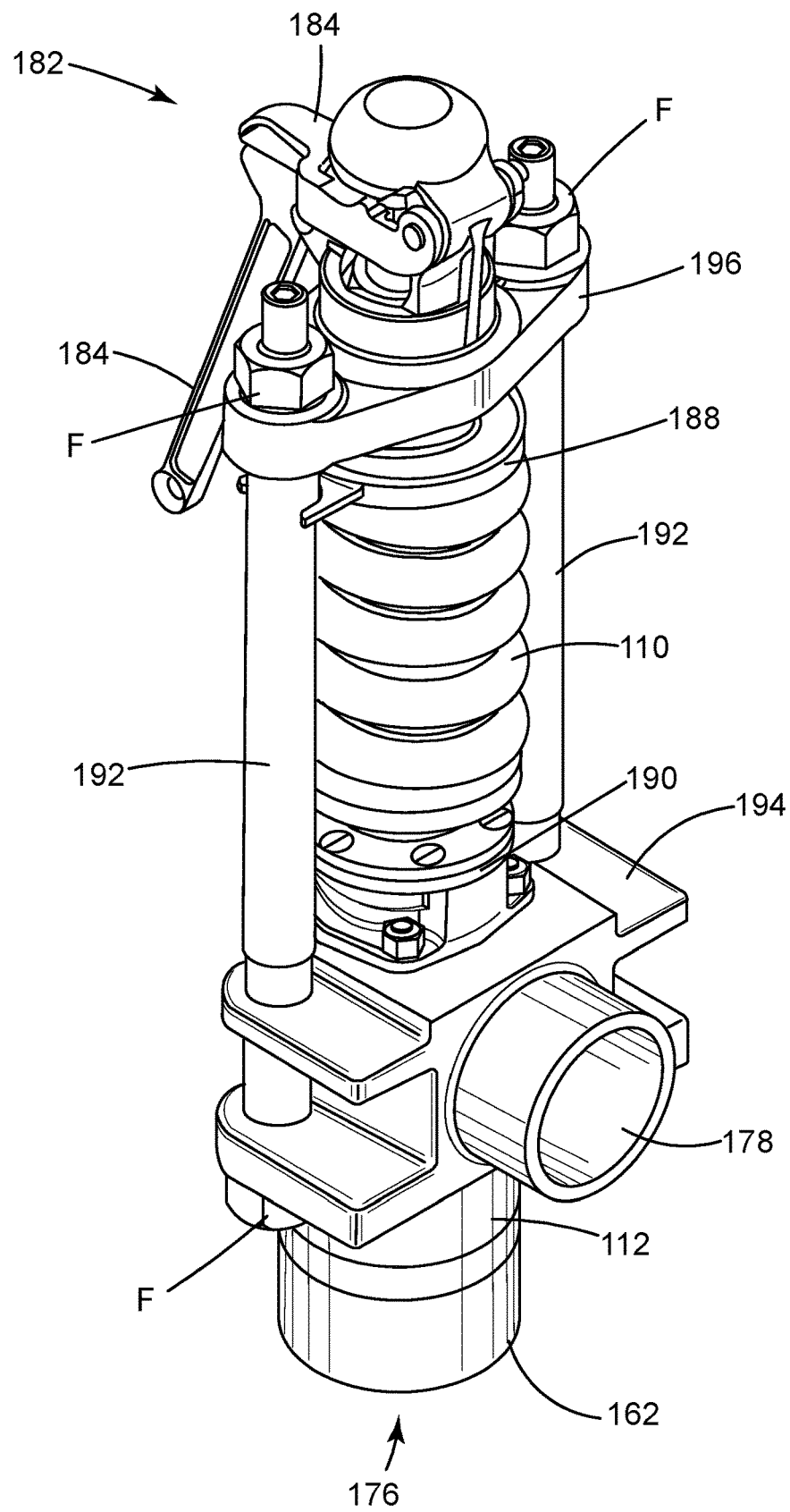
FIG. 5 depicts the exemplary safety valve of FIG. 4.

FIGS. 4 and 5 show an example of the safety valve 102 of FIG. 1. FIG. 4 shows an elevation view of the cross-section. The seat 116 may form part of an inlet neck bushing 162 that has a through-bore 164 that extends to the aperture 118. The inlet neck bushing 162 may have a generally cylindrical bottom part 166. A top part 168 of the inlet neck bushing 162 may feature a necked-down section 170 that can insert into a feature of the base 112, shown here as one of a pair of orthogonal bore sections 172, 174 that terminate at openings 176, 178. The bore sections 164, 174 create a flow path for fluid F to transit through the safety valve 102. The base 112 may connect with conduit C, for example, by way of flanged or welded ends at the openings 176, 178. In the closed position, the conical protrusion 158 of the disc 128 may extend into the aperture 118 of the seat 116. The recess 156 on the disc 128 may receive one end of a spindle 180. The other end of the spindle 180 may couple with a compression screw 182, which may connect to a cap assembly 184. The assembly may also include a lever 186 that can rotate (R) to move the cap assembly 184 along a vertical axis V. The compression spring 110 may reside between a pair of spring washers 188, 190. As best shown in FIG. 5, the safety valve 102 may include yoke rods 192 that are disposed on opposite sides of the compression spring 110. The supports 192 insert into ears 194 on the base 112 and a yoke 196 proximate the yoke cap assembly 184. Fasteners F may secure to opposite ends of the supports 192 to secure the assembly of the safety valve 102.

In view of the foregoing, the improvements herein outfit safety valves to perform under extreme operating conditions. These improvements employ unique geometry to form a metal-to-metal seal that maintains its integrity under high pressures and temperatures, like those conditions consistent with super-heated steam in power plants. This geometry may include a flexible, finger-like projection from the disc. This projection tends to flex outwardly under downstream pressure to better engage with the seat at the metal-to-metal seal.

Examples appear below that include certain elements or clauses one or more of which may be combined with other elements and clauses to describe embodiments contemplated within the scope and spirit of this disclosure. The scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A safety valve, comprising:
   a base;
   a seat disposed in the base, the seat having an aperture with a longitudinal axis;
   a disc moveable relative to the seat, the disc having an end with an arcuate finger circumscribing the longitudinal axis and bending inwardly toward the longitudinal axis and downwardly toward the seat,
   wherein the arcuate finger is configured to flex in response to contact with the seat, and
   wherein the disc comprises a plurality of recesses in the arcuate finger that circumscribe the longitudinal axis.

2. A safety valve, comprising:
   a base;
   a seat disposed in the base, the seat having an aperture with a longitudinal axis;
   a disc moveable relative to the seat, the disc having an end with an arcuate finger circumscribing the longitudinal axis and bending inwardly toward the longitudinal axis and downwardly toward the seat,
   wherein the arcuate finger is configured to flex in response to contact with the seat, and
   wherein the arcuate finger has an outer surface that contacts an arcuate surface of the seat in a closed position.

3. The safety valve of claim 2, wherein the disc has a conical portion extending from one end and terminating in a blunt end proximate the seat.

4. The safety valve of claim 2, wherein the disc comprises a recess in the arcuate finger that circumscribes the longitudinal axis.

5. The safety valve of claim 2, wherein the disc comprises a recess on an end opposite a conical protrusion on the disc.

6. The safety valve of claim 2, wherein the arcuate surface circumscribes the longitudinal axis.

7. The safety valve of claim 6, wherein the arcuate surface has a radius that matches the radius of the arcuate finger.

8. The safety valve of claim 2, wherein the arcuate surface is on an interior surface of the aperture that circumscribes the longitudinal axis.

9. The safety valve of claim 2, further comprising:
   a spindle coupled with the disc on an end opposite the arcuate finger.

10. The safety valve of claim 2, further comprising:
    a compression spring at least partially deflected to apply a load on the disc.

11. A safety valve, comprising:
    a base comprising bore sections forming a flow path between a pair of openings; and a closure assembly disposed in the base, the closure assembly comprising a disc and a seat, the disc being arranged to create a self-energizing seal with the seat in response to fluid pressure that acts on the disc, wherein the disc and the seat form arcuate contact surfaces that contact one another to form the self-energizing seal.

12. The safety valve of claim 11, wherein the self-energizing seal comprises a flexible part of the disc.

13. The safety valve of claim 11, wherein the self-energizing seal comprises a flexible part of the disc that flexes outwardly toward the seat.

14. The safety valve of claim 11, wherein the self-energizing seal include a surface on the disc with concentric recesses disposed therein.

15. A safety valve, comprising:

a base forming a flow path for fluid to transit between a pair of openings;

a closure assembly disposed in the base and interposed between the pair of openings, the closure assembly comprising two components, each having an arcuate contact surface that contact one another to create a metal-to-metal seal, wherein one of the arcuate contact surfaces is moveable relative to the other arcuate contact surface independent of movement of the components.

16. The safety valve of claim 15, further comprising:

a spindle coupled with one of the components of the closure assembly.

17. The safety valve of claim 15, further comprising:

a compression spring at least partially deflected to apply a load on one of the components of the closure assembly.

18. A safety valve, comprising:

a base forming a flow path for fluid to transit between a pair of openings;

a closure assembly disposed in the base and interposed between the pair of openings, the closure assembly comprising two components, each having an arcuate contact surface that contact one another to create a metal-to-metal seal, wherein one of the arcuate contact surfaces is flexible under fluid pressure.

19. The safety valve of claim 18, wherein one of the arcuate contact surfaces flexes outwardly and downwardly under fluid pressure.

* * * * *